United States Patent
Tipton et al.

(10) Patent No.: US 12,352,690 B2
(45) Date of Patent: Jul. 8, 2025

(54) IN-LINE GAS SENSOR AND SENSING METHODS

(71) Applicant: INTEGRITY COMMUNICATIONS SOLUTIONS, INC., Colorado Springs, CO (US)

(72) Inventors: Michael Lenn Tipton, Colorado Springs, CO (US); Fred Bonn, Colorado Springs, CO (US)

(73) Assignee: INTEGRITY COMMUNICATIONS SOLUTIONS, INC., Colorado Springs, CO (US)

( * ) Notice: Subject to any disclaimer, the term of this patent is extended or adjusted under 35 U.S.C. 154(b) by 0 days.

(21) Appl. No.: 18/836,645

(22) PCT Filed: Mar. 8, 2023

(86) PCT No.: PCT/US2023/063921
§ 371 (c)(1),
(2) Date: Aug. 7, 2024

(87) PCT Pub. No.: WO2023/172947
PCT Pub. Date: Sep. 14, 2023

(65) Prior Publication Data
US 2025/0155368 A1  May 15, 2025

Related U.S. Application Data

(60) Provisional application No. 63/318,298, filed on Mar. 9, 2022.

(51) Int. Cl.
*G01N 21/3504* (2014.01)

(52) U.S. Cl.
CPC ... *G01N 21/3504* (2013.01); *G01N 2201/062* (2013.01)

(58) Field of Classification Search
CPC ................. G01N 21/3504; G01N 2201/062
See application file for complete search history.

(56) References Cited

U.S. PATENT DOCUMENTS

| 5,021,677 A | 6/1991 | Igarashi et al. |
| RE36,277 E | 8/1999 | Black et al. |

(Continued)

FOREIGN PATENT DOCUMENTS

WO  2023172947 A1  9/2023

OTHER PUBLICATIONS

"Examination Report for AU 2023231223, mailed Sep. 23, 2024 pp. all".

(Continued)

*Primary Examiner* — David P Porta
*Assistant Examiner* — Meenakshi S Sahu
(74) *Attorney, Agent, or Firm* — Dorsey & Whitney LLP

(57) ABSTRACT

Apparatuses, systems, and methods for in-line gas sensor. The gas sensor includes a first circuit board which supports an illumination source and a second circuit board which supports a detector with a sample chamber positioned between the first and the second circuit board. A gas sample passes through the first circuit board and the second circuit board to enter/exit the sample chamber. Each circuit board may have one or more flow apertures which allow the gas sample to pass through the circuit board to get to/from an interior of the sample chamber.

23 Claims, 8 Drawing Sheets

(56) References Cited

U.S. PATENT DOCUMENTS

| | | | |
|---|---|---|---|
| 11,692,934 B2* | 7/2023 | Normand | G01J 3/0229 |
| | | | 356/437 |
| 2013/0271751 A1 | 10/2013 | Macgegor et al. | |
| 2015/0101395 A1 | 4/2015 | Dehe et al. | |

OTHER PUBLICATIONS

"Examination Report for NZ Appl. No. 813590, mailed on Oct. 14, 2024 pp. all".
International Search Report and Written Opinion for PCT Application No. PCT/US2023/063921, mailed on Jul. 17, 2023, 16 pages.
SMARTGAS, "This is how the NDIR sensors from smartGAS work", https://www.smartgas.eu/en/news/single-view/detail/so-funktionieren-die-ndir-sensoren-von-smartgas, Feb. 10, 2021, 4 pages.

\* cited by examiner

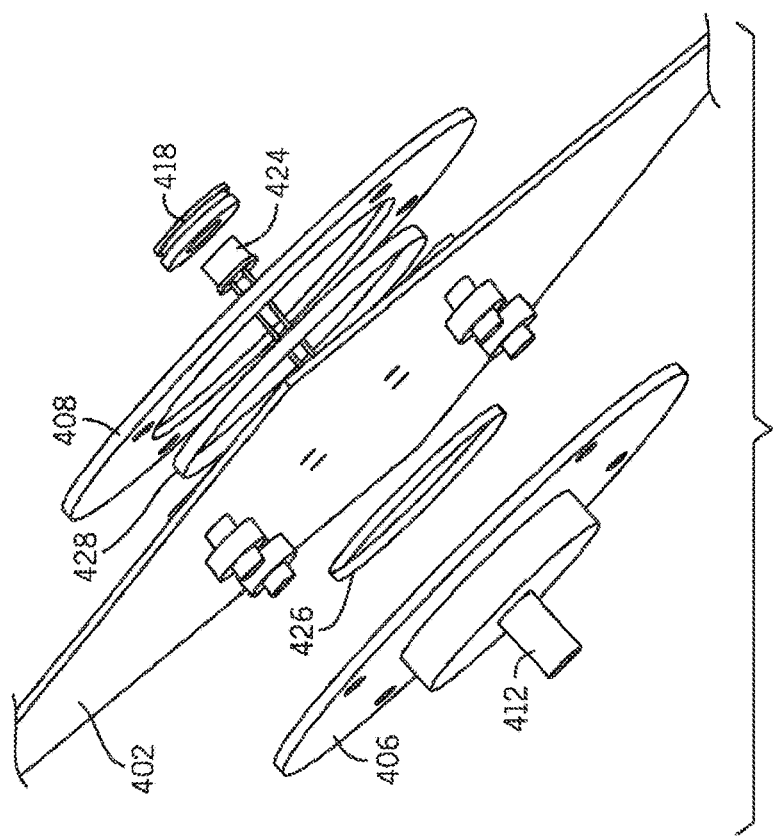
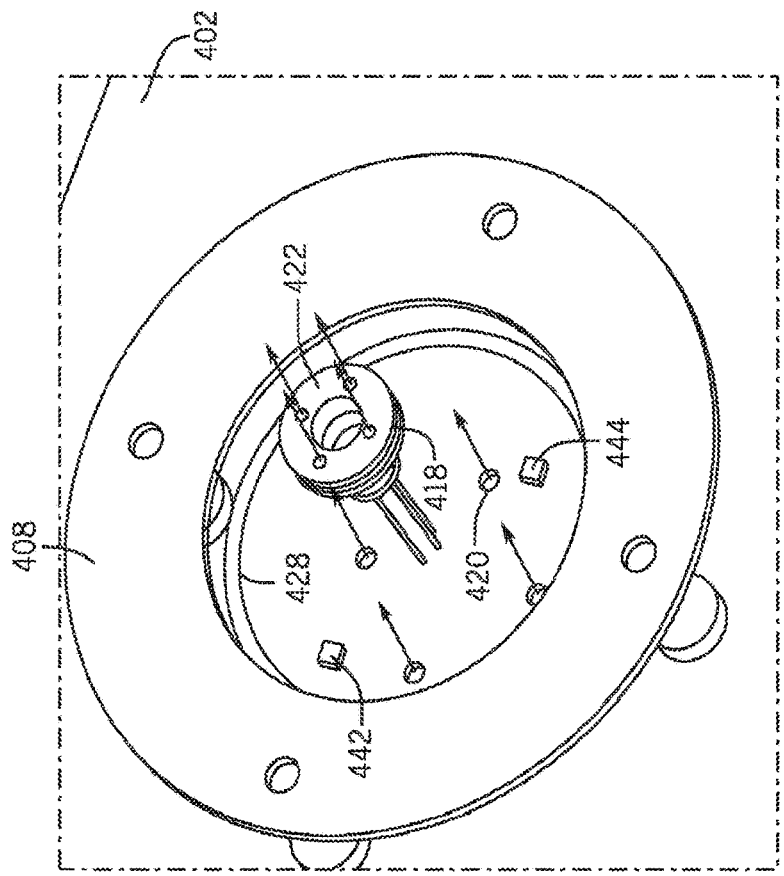
FIG. 5A
FIG. 5B

IN-LINE GAS SENSOR AND SENSING METHODS

CROSS-REFERENCE TO RELATED APPLICATION(S)

This application is a U.S. National Stage filing under 35 U.S.C. § 371 of PCT Application No. PCT/US2023/063921, filed Mar. 8, 2023, entitled "IN-LINE GAS SENSOR AND SENSING METHODS." which claims the benefit under 35 U.S.C. § 119 of the earlier filing date of U.S. Provisional Application Ser. No. 63/318,298, titled "Gas Sensor" filed Mar. 9, 2022, the entire contents of which are hereby incorporated by reference in their entirety for any purpose.

TECHNICAL FIELD

Embodiments of the invention relate generally to gas sensing, and particularly, to non-dispersive infrared detectors.

BACKGROUND

There are a variety of applications where it is useful to monitor a concentration of one or more target gases in an environment. For example, there is growing interest in environmental monitoring of greenhouse gases or other pollutants which may be released from sites such as well-sites, industrial facilities, pipelines, and so forth. For many of these applications, it may be useful to detect relatively low concentrations of the target gas(es).

Spectroscopy offers a useful approach for sensing the concentration of a chosen target gas, as it can be specific to a target gas even in a mix of other gases, and can be implemented with a range of optical components. A spectroscopic sensor may hold a sample of gas in a sample chamber and pass light through the gas to a detector. Since the detection of the target gas may be partially dependent on the path(s) the light takes through the sample chamber, it may be useful to design the sample chamber to decrease blockages or other impediments that prevent some light paths from reaching the detector.

SUMMARY

In at least one aspect, the present disclosure relates to an apparatus which includes a first port, a second port, an illumination circuit board, a detector circuit board, and a sample chamber. The illumination circuit board includes a light source which generates illumination light and the detector circuit board includes a detector which measures a received portion of the illumination light. The sample chamber is positioned between the illumination circuit board and the detector circuit board. The sample chamber is in fluid communication with the first board through the illumination circuit board and the sample chamber is in fluid communication with the second port through the detector circuit board.

The illumination circuit board may include at least one flow aperture which allows passage of fluid through a thickness of the illumination circuit board, and the detector circuit board may include at least one flow aperture which allows passage of fluid through a thickness of the detector circuit board.

The apparatus may also include a first manifold in fluid communication with the first port, a second manifold in fluid communication with the sample chamber, where the first manifold and the second manifold are in fluid communication with each other through the illumination circuit board, a third manifold in fluid communication with the sample chamber, and a fourth manifold in fluid communication with the second port, where the third manifold and the fourth manifold are in fluid communication with each other through the detector circuit board.

The sample chamber may be formed from a pipe. The light source may be a light emitting diode. The apparatus may be a non-dispersive infrared detector. The apparatus may include an optical filter positioned between the sample chamber and the detector. The apparatus may include at least one sensor on the illumination circuit board, which measures temperature, pressure, humidity, or combinations thereof. The apparatus may include a controller in electrical communication with the detector which determines a concentration of a target gas in the sample chamber based on the received portion of the illumination light.

In at least one aspect, the present disclosure relates to an apparatus including a sample chamber, an illumination carrier and a detector carrier. The illumination carrier includes a first port and a first substrate having a front side and a back side opposite the front side, the front side of the first substrate facing the sample chamber. The input carrier includes a light source positioned on the front side of the first substrate and the first port is fluidly coupled through the first substrate to an interior of the sample chamber. The detector carrier includes a second port and a second substrate having a front side and a back side opposite the front side, the front side of the second substrate facing the sample chamber. The detection carrier includes a detector positioned on the front side of the second substrate, where the second port is fluidly coupled through the second substrate to the interior of the sample chamber.

The first port may receive a gas sample and the second port may exhaust the gas sample. The apparatus may include a controller which measures a concentration of a target gas in the gas sample based on an amount of light emitted by the light source and an amount of light received by the detector.

The first may include a first plurality of flow apertures which place the front side of the first substrate in fluid communication with the back side of the first substrate, and the second substrate may include a second plurality of flow apertures which place the front side of the second substrate in fluid communication with the back side of the second substrate.

The illumination carrier may include a first back plate which forms a first manifold between the first port and the back side of the first substrate and a first front plate which forms a second manifold between the front side of the first substrate and the interior of the sample chamber, where the first manifold and the second manifold are in fluid communication through the first substrate. The detector carrier may include a second front plate which forms a third manifold between the interior of the sample chamber and the front side of the second substrate and a second back plate which forms a fourth manifold between the back side of the second substrate and the second port, where the third manifold and the fourth manifold are in fluid communication through the second substrate.

The apparatus may include a first at least one fastener which secures the first back plate to the first front plate through the first substrate and a second at least one fastener which secures the second back plate to the second front plate through the second substrate. The first circuit, the second substrate, or combinations thereof may include a pressure sensor, a humidity sensor, a temperature sensor, or combinations thereof. The sample chamber may be cylindrical, and a first end of the sample chamber may be coupled to the illumination carrier and a second end of the sample chamber may be coupled to the detector carrier. The apparatus may include an optical filter positioned between the second end of the sample chamber and the detector.

In at least one aspect, the present disclosure relates to a method which includes receiving a gas sample in a sample chamber through a first circuit board, detecting a concentration of a target gas in the gas sample by passing light from an illumination source on the first circuit board through the sample chamber to a detector on a second circuit board, and exhausting the gas sample from the sample chamber through the second circuit board.

The method may also include controlling an intensity of the light based on a reference signal from the illumination source. The method may also include measuring additional properties of the gas sample with one or more sensors on the first circuit board, the second circuit board, or combinations thereof, where the additional properties include temperature, pressure, humidity, or combinations thereof. The method may also include measuring the gas concentration based, in part, on the additional properties. The method may also include collecting the gas sample from a suspected emission source and determining if the suspected emission source is emitting the target based on the measured concentration.

BRIEF DESCRIPTION OF THE DRAWINGS

FIGS. 5A-5B are exploded perspective diagrams of the source carrier of FIG. 4.

DETAILED DESCRIPTION

Figure 1:
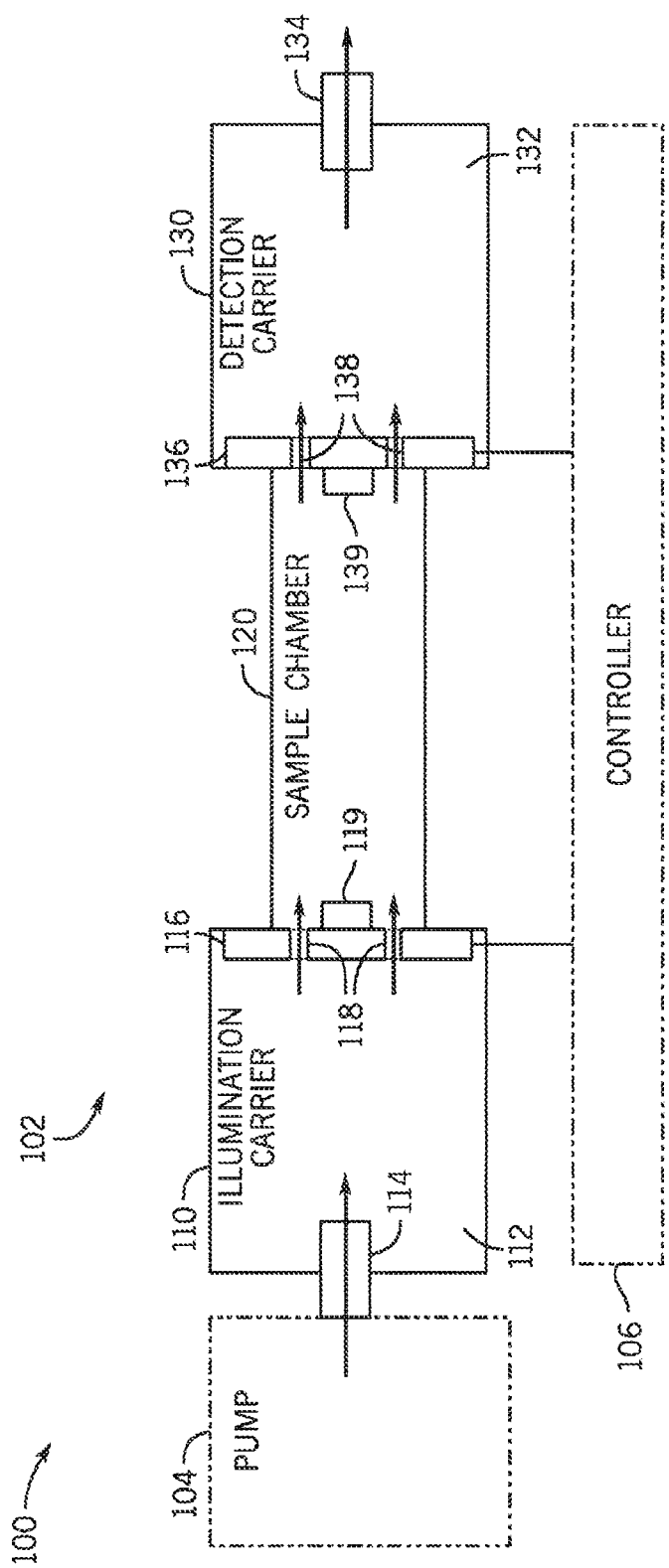
FIG. 1 is a cross-sectional diagram of a measurement system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Optical gas sensors, such as non-dispersive infrared (NDIR) sensors, use light to measure a concentration of one or more target gases in a gas sample. The sensor may generally operate based on spectroscopic principles such as the Beer-Lambert law to measure a concentration of gas between a source and a detector. The gas sample may be held in a sample container with the source at one end and the detector at the other. The ability to measure the target gas in the sample chamber may be based, in part, on an optical path length between the light source and the detector. In order to achieve the lowest possible limit of detection and/or to better control the geometry of various light paths through the chamber, it may be desirable to set up the geometry of the sensor such that the number of obstructions or other locations which may break up optical paths between the source and detector are minimized.

The present disclosure is related to apparatuses, systems and methods for an in-line gas sensor. In an example gas sensor of the present disclosure, an illumination carrier and a detector carrier are both coupled with a sample chamber between them. The illumination carrier has a light source facing into an interior of the sample chamber and the detection carrier has a detector facing into the interior of the sample chamber. The illumination carrier also has a port (e.g., an inlet/outlet) on a backside (e.g., the side facing away from the interior of the sample chamber) which is coupled through the illumination carrier to the interior of the sample chamber. Similarly, the detection carrier has a port on a backside coupled through the carrier to the interior of the sample chamber. The ports are fluidly coupled through their respective carriers into the sample chamber. In this manner, the ports which couple fluid into and out of the sample chamber may be behind the light source and detector, may allow for relatively controlled geometry of the sample chamber itself. For example, the sample chamber may be a pipe with a reflective inner surface with the source and detector at either end, with the gas sample passing through the carriers which hold the source and detector.

In an example implementation, the carriers may each include a respective manifold coupled to the port and a respective substrate which holds the source or detector as well as other electronics (e.g., other sensors, drivers, logic, etc.). The substrate (e.g., a circuit board, a bread board, or other substrate that supports electronics) may include one or more passages (or flow apertures, vent holes, or other apertures) through the substrate allowing gas in the manifold to pass though the substrate and into the sample chamber. Passing the gas sample through the substrate may also allow sensors mounted on the substrate (e.g., temperature sensors, pressure sensors, etc.) to take more accurate readings as they are more closely positioned with respect to the sample.

FIG. 1 is a cross-sectional diagram of a measurement system according to some embodiments of the present disclosure. The measurement system 100 includes a sensor 102 or sensor assembly, along with optional components which support the operation of the sensor, such as a pump 104 and controller 106. The sensor 102 includes a sample chamber 120 which receives a gas sample, an illumination carrier 110 coupled to an illumination source 119 and a detector carrier 130 coupled to a detector 139. The illumination source 119 directs light into the sample chamber 120 and the detector 139 measures or detects received light. A concentration of one or more target gases within the gas sample is measured based on the detected received light at the detector 139 (e.g., as measured or determined based on an output of the detector 139).

The sensor 102 includes a first port 114 and a second port 134 either or both of which allow the target gas to enter the sample chamber 120. The illumination carrier 110 includes a first port 114 fluidly coupled between an outside of the senor 102 and a manifold 112 of the illumination carrier 110. One or more passages 118 (e.g., flow apertures) through a substrate or circuit board 116 (e.g., a substrate supporting or coupled to one or more electronic components, such as sensors) that supports the illumination source 119 fluidly coupled the manifold to the sample chamber 120. In a similar fashion, the sample chamber 120 is fluidly coupled through one or more passages 138 in a detector substrate or detector circuit board 136 of the detection carrier 130 supporting or coupled to the detector 139 into a second manifold 132 in the detection carrier 130. The second manifold 132 is fluidly coupled outside the sensor 102 via a second port 134. For example, in some embodiments, the gas sample may enter and exhaust through the ports 114 and 134 to an ambient environment around the sensor 102. In some embodiments, the gas sample may enter one of the ports 114 and 134 from a controlled source (e.g., a suspected leak site, a container with a sample, etc.). In some embodiments, the gas sample may be exhausted into a container and/or filter.

In the example illustration of FIG. 1, the first port 114 is shown as an inlet and the second port 134 is an outlet. Arrows illustrate an example flow of gas (or other component to be detected) from the inlet 114 through the illumination circuit board 116 into the sample chamber 136, through the detection circuit board 136 and out the outlet 134. However, in some embodiments, the direction of flow may be reversed, with the gas sample flowing from the second port 134 into the sample chamber 120 and out the first port 114 (e.g., the second port 134 may be the inlet and the first port 114 may be the outlet). In some embodiments, a single sensor 102 may operate with gas flowing in either direction. For the sake of consistency, the example sensors and components described herein will generally be described with respect to a gas sample flowing into an illumination carrier through a sample chamber and out the detection carrier. However, any of the sensors described herein may be set up to operate in either direction.

The carriers 110 and 130 include a respective circuit board 116 and 136. The circuit boards 116 and 136 include one or more electronic components that enable the operation of the respective illumination source 119 and detector 139 or may otherwise be used to communicate therebetween. For example, the circuit boards 116 and 136 may include driver circuits (e.g., current and/or voltage drivers), switches, sensors, conductive elements (e.g., buses, wires, etc.), control logic, power sources, interface terminals (e.g., external connections), or combinations thereof.

The circuit boards 116 and 136 may generally be flat, with a first side and a second side opposite the first side act as a substrate or support structure to receive one more electronic components. The circuit boards 116 and 136 may have any geometry, such as circular, square, rectangular, etc. One side of the circuit boards 116/136 may generally be positioned facing the sample chamber 120, while a second side is positioned facing away from the sample chamber 120 and towards a respective manifold 112 or 132. The circuit boards 116 and 136 include one or more passages 118 and 138 (e.g., apertures or thought holes) respectively that pierce or extend through a thickness of the circuit board 116/136 to place the front and the back side of the circuit board in fluid communication with each other such that gases and other fluids can pass from one side of the circuit board to the other. The passages 118 and 138 may be formed in the material of the circuit board 116/136 or may be added by later processing (e.g., drilled through the board).

The illumination source 119 is mounted on the circuit board 116 of the illumination carrier 110. The illumination source 119 generates light including a measurable amount of radiation at a wavelength with interacts with a target gas. For example, if the target gas is methane, then the illumination source 119 may put out radiation at a wavelength of about 3.3 um. In some embodiments, the illumination source 119 may be a broad band source. In some embodiments, the illumination source 119 may be a narrowband source that primarily outputs radiation at or around a target wavelength. In some embodiments, the illumination source 119 may be an incandescent light, a light emitting diode (LED), a laser, or other component configured to generate the desired radiation. In some embodiments, the illumination source 119 may include optics (not shown in FIG. 1) to condition the light. For example, the illumination source 119 may include a lens, filter, mirror, or combinations thereof.

The detector 139 is mounted on the circuit board 136 of the detector carrier 130. The detector 139 generates a signal based on a received amount of light. In some embodiments, the detector 139 may be sensitive to a wide spectrum of light. In some embodiments, the detector 139 may be sensitive to a specific range of wavelengths. The detector 139 may be chosen such that it is sensitive to one or more wavelengths produced by the illumination source 119 and which interact with the target gas. In some embodiments, the detector 139 may be a photodiode, a photomultiplier tube, or an avalanche photodiode. In some embodiments, the detector 139 may include one or more optics (not shown in FIG. 1) to condition the light which reaches the detector 139. For example, the detector 139 may include a lens, filter, mirror, diffraction grating, or combinations thereof.

In some embodiments, one or both of the circuit boards 116 and 136 may include one or more additional sensors. For example, temperature sensors, pressure sensors, humidity sensors, or combinations thereof may be positioned on one or both of the circuit boards 116 and 136. In some embodiments, the illumination circuit board 116 provides a signal which indicates a power output of the illumination source 119.

The sample chamber 120 contains and/or is able to receive a gas sample and allows light to pass from the illumination source 119 to the detector 139. It may be advantageous for the sample chamber 120 to maximize the amount of light which can pass from the source 119 to the detector 139. In some example embodiments, the sample chamber 120 may be a tube or pipe (e.g., include a flow passage therethrough). In some embodiments the sample chamber 120 may have continuous side walls, since the sample gas passes in and out of the chamber through the circuit boards 116 and 136 which are positioned at either end of the sample chamber (e.g., as end caps of the tube).

In some embodiments, a lumen defined within the sample chamber 120 may be reflective or otherwise have a high albedo. For example, the lumen of the sample chamber 120 may have a reflective coating, such as being gilded. In some embodiments, the sample chamber 120 may be set up to increase a path length of light from the source 119 to the detector 139. For example, the sample chamber 120 may be set up as a white chamber or a ring-down cavity.

In some embodiments, the ports 114 and/or 134 may be open or fluidly coupled to an ambient environment. In some embodiments, the sensor 102 may be positioned near a target area (e.g., a wellsite, a piece of industrial equipment, a landfill, etc.) to monitor for the presence of the target gas in that area. In some embodiments, the gas sample (or fluid including such a sample) may be flowed into or otherwise directed into the sample chamber 120. For example, an optional pump 104 may apply pressure to move the gas sample into the sample chamber 120. The pump 104 may draw the sample gas from the ambient environment or may be coupled to a source of the sample gas. For example, a piece of equipment to be monitored may be surrounded in a gas impermeable layer (e.g., plastic sheeting) and the air inside the layer may be moved by the pump 104 into the sample chamber.

In some embodiments, the sensor 102 may include additional hardware not shown in the view of FIG. 1. For example, the sensor 102 may include O-rings, gaskets, sealant or other hardware to prevent inadvertent flow gas through the sensor 102 (e.g., configured to generate a seal). In some embodiments, fasteners (e.g., screws, bolts etc.) not shown in FIG. 1 may be used to hold the sensor 102 together. In some embodiments, the sensor 102 may include housing or other enclosure. In some embodiments 102 the sensor may include one or more access or communications ports, such as power and/or data ports which connect to an external controller 106.

The sensor 102 may be coupled to an optional controller 106, which may operate or at least communication with the sensor 102 and interpret and/or receive signals from the detector 139 to determine a gas concentration measurement of the target gas within the sample chamber 120. In some embodiments, the controller 106 may be external to the sensor 102. The controller 106 may be coupled to the circuit boards 116 and/or 136 with wired communication, wireless communication or combinations thereof. In some embodiments, the sensor 102 may be coupled using commercially available connection standards (e.g., Bluetooth. Wi-Fi. and/or USB). In some embodiments, the controller 106 may be a purpose built piece of equipment, a general purpose computer (e.g., a tablet, a laptop, a desktop, a phone), or combinations thereof.

Figure 2:
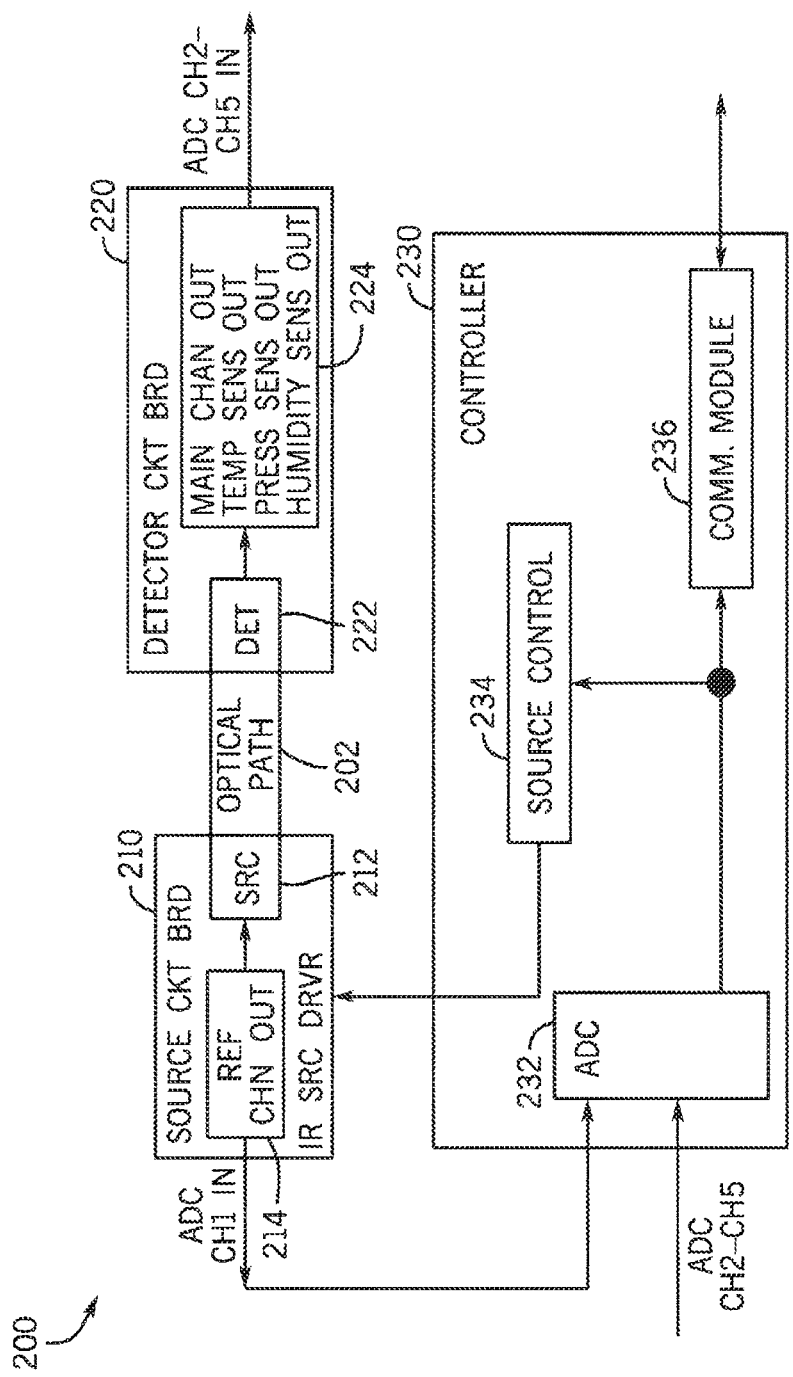
FIG. 2 is a block diagram of the electronics of a measurement system according to some embodiments of the present disclosure.

FIG. 2 is a block diagram of the electronics of a measurement system according to some embodiments of the present disclosure. The measurement system electronics 200 may, in some embodiments, be included in the measurement system 100 of FIG. 1. The view of FIG. 2 shows a representation of different components on the source circuit board 210 (e.g., illumination circuit board 116 of FIG. 1), detector circuit board 220 (e.g., 136 of FIG. 1) and controller 230 (e.g., 106 of FIG. 1) which may be used to perform gas concentration measurements.

The source circuit board 210 includes a source 212 (e.g., 119 of FIG. 1) and a driver 214. The driver 214 provides a controlled voltage and/or current to the source 212 based on a signal IR Src Drvr from the controller 230. The source circuit board 210 provides a signal (e.g., Ch1) which may act as a reference level which represents a power output of the driver 214 and/or source 212.

The detector circuit board 220 includes the detector 222 (e.g., 139 of FIG. 1) which receives light along an optical path 202 (e.g., through the sample chamber) and provides an output signal (e.g., Ch2) based on the amount of received light. The detector circuit board 220 also includes one or additional sensors, such as temperature, pressure, and humidity sensors, which also output signals based on their respective measurements (e.g., Ch3-Ch5).

The signals from the two circuit boards 210 and 220 Ch1-Ch5 are provided to the controller 230. An analog-to-digital converter (ADC) 232 of the controller 230 receives the signals Ch1-Ch5 and generates digital signals based on the received signals. The digital signals are provided to a communications module and to a communications module 236 and/or to a system logic circuit 234.

The system logic 234 may process the raw signals and generate one or more outputs based on those signals. The system logic 234 may be a microprocessor, a FPGA, a custom chip, or combinations thereof. The system logic 234 may set a level of the source control signal IR Src Drvr based on the reference channel (e.g., Ch1) from the driver 214. The system logic 234 may also generate a gas concentration measurement of a target gas along the optical path 202 based on the signal from the detector 224 (e.g., Ch2). For example, the system logic 234 may use the Beer-Lambert law, or one or more equations derived therefrom to calculate the target gas concentration based on optical path length 202, the intensity of the illumination from the source 212, the amount of received light at the detector 222 and one or more properties of the target gas such as the coefficient of extinction and/or absorption. In some embodiments, the system logic 234 may take into account additional measurements (e.g., temperature, pressure and/or humidity Ch3-Ch5), for example to more accurately determine the coefficient of extinction for the given conditions.

The communications module 236 may send and receive information to and from the controller 230. For example, the communications module may be a wireless and/or wired connection to an outside system. In some embodiments, the communications module 236 may provide a calculated gas concentration measurement from the system logic 234. In some embodiments the communications module 236 may send one or row measurements (e.g., one or more of Ch1-Ch5). In some embodiments, the communications module 236 may receive instructions (e.g., an 'on' command, a command to take a measurement, etc.) from an external source.

The controller 230 has been shown in FIG. 2 as an external component. However, in some embodiments of the present disclosure, one or more components of the controller 230 may be integrated into the sensor. For example, one or more components may be located on the circuit boards 210 and/or 220.

Figure 3:
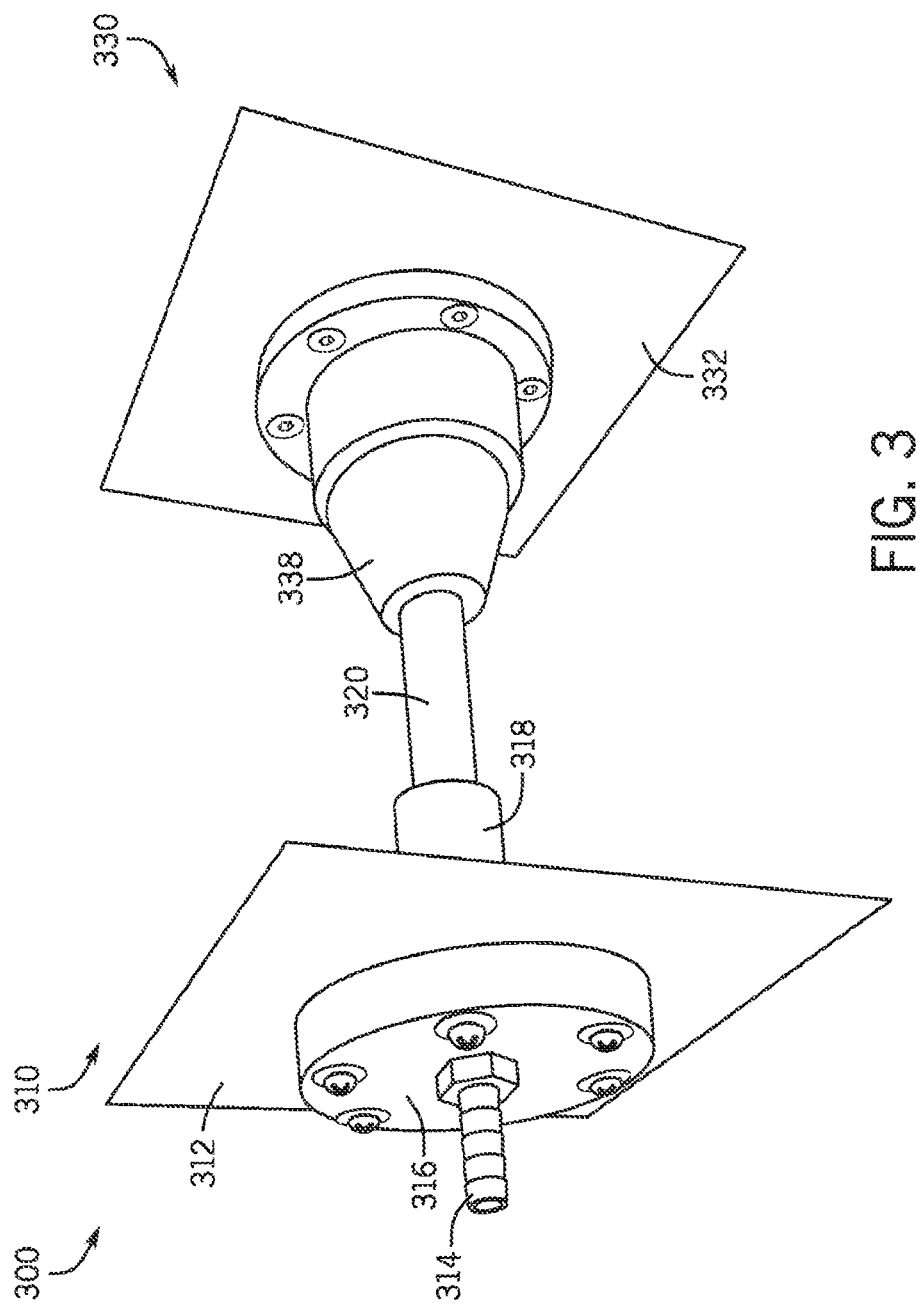
FIG. 3 is a perspective view of a sensor according to some embodiments of the present disclosure.

FIG. 3 is a perspective view of a sensor according to some embodiments of the present disclosure. The sensor 300 of FIG. 3 may, in some embodiments, implement the sensor 102 of FIG. 1 and/or be included in the measurement system 200 of FIG. 2.

FIG. 3 shows an exterior view of an example sensor 300. The sensor 300 includes a source carrier 310 (e.g., 110 of FIG. 1), a sample chamber 320 (e.g., 120 of FIG. 1), and a detector carrier 330 (e.g., 130 of FIG. 1). The source carrier 310 includes a circuit board 312 (e.g., 116 of FIGS. 1 and/or 210 of FIG. 2) which is held between a back plate 316 and a front plate 318. A port (e.g., an inlet) 314 is coupled to the back plate 316, and the front plate couples to the sample chamber 318. Although not visible in the view of FIG. 3, the circuit board 312 supports an illumination source, which faces towards the sample chamber 320 (e.g., is on the side of the circuit board 312 facing the front plate 318).

In a similar fashion, the detection carrier includes a front plate 338 which sandwiches a circuit board 332 (e.g., 136 of FIGS. 1 and/or 230 of FIG. 2) with a back plate. The back plate is obscured by the circuit board 332 in the view of FIG. 3. The front plate 338 couples to an opposite end of the sample chamber 320 from the front plate 318. The circuit board 332 supports a detector which faces into the sample chamber 320 (e.g., is on the same side of the circuit board 332 as the front plate 338). The back plate supports a second port (obscured in the view of FIG. 3) which may act as an outlet.

The two circuit boards 312 and 332 may extend beyond the ends of their respective mounting plates. In some embodiments, one or both of the circuit boards 312 and 332 may include external connection points which are outside the area covered by the plates 316/318 and 338. For example, the circuit boards 312 and 332 may include power connections and/or data connections so that the sensor 310 may be coupled to a controller (e.g., 106 of FIGS. 1 and/or 230 of FIG. 2).

The first plate 316 has a manifold or other cavity which is in fluid communication with the port 314. The second plate has a manifold or other cavity which is in fluid communication with an interior of the sample chamber 320. The manifolds in the two plates 316 and 318 are in fluid communication via one or more passages or flow apertures within the circuit board 312. The detector carrier may be set up in a similar fashion, with a manifold in the front plate 338 in fluid communication with the sample chamber and with a back plate and second port (not shown) through one or passages or flow apertures in the circuit board 332.

Figure 4:
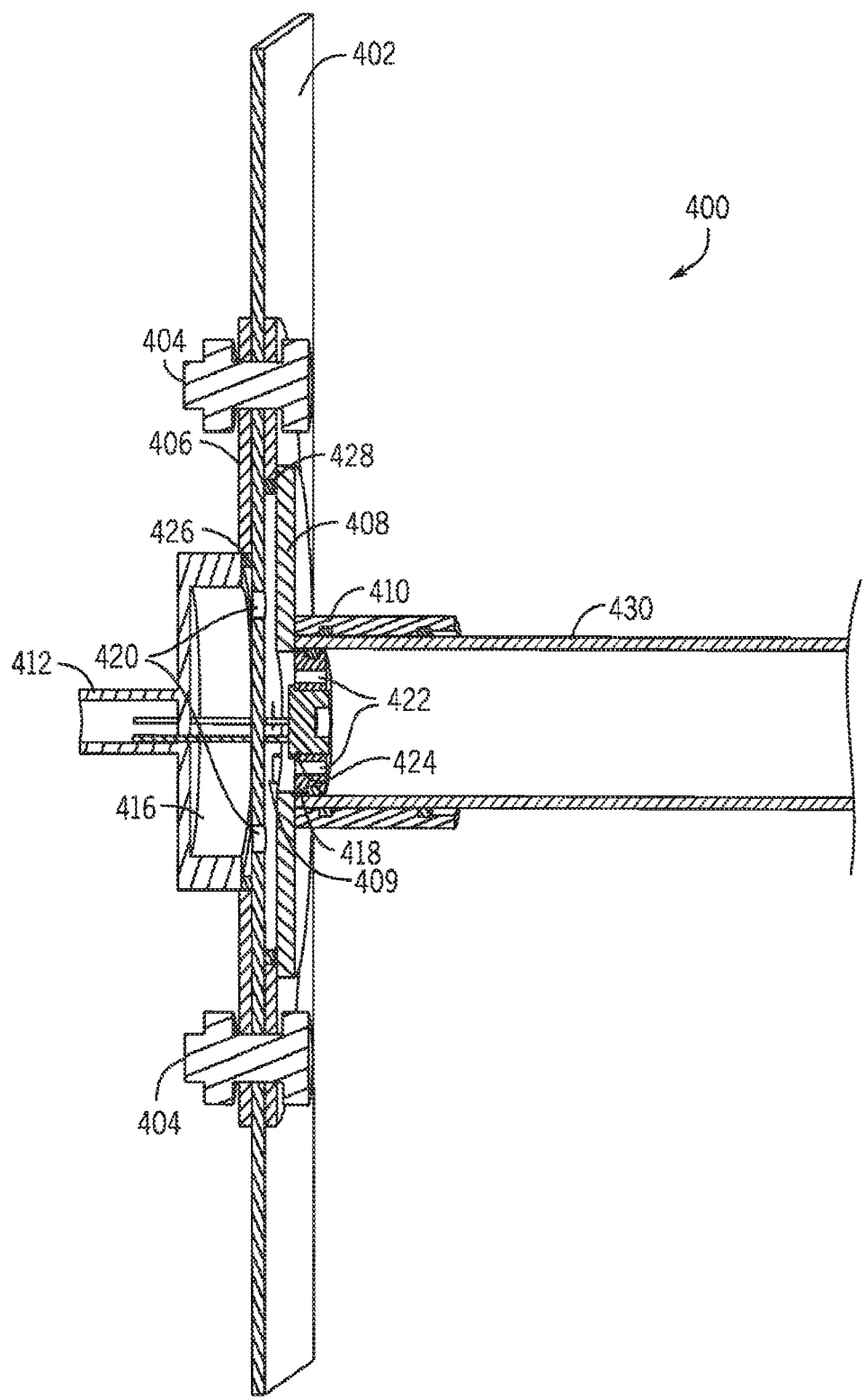
FIG. 4 is a cross-sectional schematic diagram of a source carrier according to some embodiments of the present disclosure.

FIG. 4 is a cross-sectional schematic diagram of a source carrier according to some embodiments of the present disclosure. FIGS. 5A-5B are exploded perspective diagrams of the source carrier of FIG. 4. The source carrier 400 may, in some embodiments, implement the source carrier 110 of FIGS. 1 and/or 310 of FIG. 3. The view of FIG. 4 is a cross section along a midline plane of the sensor which intersects the line running from a first port 412 to a second port (not shown in FIG. 4). The view of FIG. 5A shows a perspective view of a front side (e.g., the side facing the sample chamber and detector carrier) of the source carrier 400. The view of FIG. 5B shows a perspective view of a back side (e.g., the side facing towards a port and away from the sample chamber) of the source carrier 400. For the sake of clarity, certain components have been omitted from the views of FIGS. 5A-5B, to better allow visualization of other components they would otherwise obstruct.

The source carrier 400 supports a circuit board 402 (e.g., 116 of FIG. 1, 210 of FIG. 2, and/or 310 of FIG. 3) which supports an illumination source 424 (e.g., 119 of FIG. 1 and/or 212 of FIG. 2) and allows fluid communication between a port 412 (e.g., 114 of FIGS. 1 and/or 314 of FIG. 3) and an interior of a sample chamber 430 (e.g., 120 of FIGS. 1 and/or 320 of FIG. 3). The circuit board 402 includes one or more passages 420 (e.g., 118 of FIG. 1) which allow fluid communication between a front and back side of the circuit board 402.

The circuit board 402 is mounted between two mounting plates 406 and 408 (e.g., 316 and 318 of FIG. 3). The back plate 406 and the front plate 408 are held together and coupled to the circuit board 402 by one or more fasteners 404 (e.g., screws, bolts, rivets, etc.) which penetrate the two plates 406 and 408 and the circuit board 402. The back plate 406 includes a portion which is flat to the circuit board 402 and a portion which is raised a distance off the circuit board 402 to form a manifold 416. An edge of the manifold 416 is sealed to the circuit board 402 with an O-ring 426. In some embodiments, the walls of the manifold 416 may be a separate piece which is mounted to the back plate 406. The interior of the manifold 416 is in fluid communication to an outside the source carrier 400 via a first port 412. For example, the port 412 may be a generally tubular component which pierces a back wall of the manifold 416.

The front plate 408 includes a portion which is flat against the circuit board 402 and a portion which is raised off of the circuit board 402 to form a manifold 409. An edge of the manifold 409 is sealed to the circuit board 402 by an O-ring 428. The interior of the manifold 409 is in fluid communication with an interior of the manifold 416 through one or more flow apertures 420 in the circuit board 402. The flow apertures 420 may penetrate a thickness of the circuit board 402. As may be seen in the view of FIGS. 5A-5B, the flow apertures 420 may be radially symmetric. For example, the flow apertures may be evenly spaced around a perimeter of a circle which is smaller than a radius of the manifolds 416 and 409.

The front plate 408 supports a source mount 418, which in turn supports an illumination source 424. The illumination source 424 and source mount 418 may be mounted a distance off the circuit board 402, with the manifold 409 between a front surface of the circuit board 402 and a back surface of the source mount 418. The source 424 may be coupled to the circuit board 402, for example with one or more wires or other connectors. In addition to various components (e.g., wires, drivers, etc.) directly used to operate the source 424, the circuit board 402 may also support one or more additional components, such as sensors 442 and 444 (as seen in the view of FIG. 5A). The sensors 442 and 444 may be positioned on a portion of the circuit board 402 which is within the manifold 409. This may allow the sensors 442 and 444 to gather information about any sample gas flowing through the manifold 409 (which in turn is in fluid communication with the sample chamber 430). The sensors 442 and 444 may measure properties such as temperature, humidity, pressure, or combinations thereof.

The source mount 418 has one or more passages 422 to allow fluid communication between a front side and a back side of the source mount 418. A back side of the source mount 418 faces the manifold 409, and a front side faces into an interior of the sample chamber 430. As shown by the arrows in FIG. 5A, the flow apertures 420 and 422 allow fluid communication between a port 412 and a front side of the source mount 422 into the sample chamber.

The front plate 408 has a sample chamber holder 410 coupling or supporting the sample chamber 430. In the example geometry of FIGS. 4-5B, the sample chamber 430 is generally cylindrical (e.g., a pipe or tube). Accordingly, the sample chamber holder 410 may also be cylindrical, and an inner radius of the sample chamber holder 410 receives an outer radius of the sample chamber 430. In some embodiments, one or more O-rings, U-cups, or gaskets may be used to help secure the sample chamber holder 410 to the sample chamber 430. In some embodiments, the source mount 418 may extend into an interior of the sample chamber 430. For example, an outer diameter of the source mount 418 may fit inside an inner diameter of the sample chamber 430. In some embodiments, the sample chamber 430 may be held between an outer surface of the source mount 418 and an inner surface of the sample chamber mount 410. In some embodiments, additional O-rings or other gaskets may be positioned on an outer surface of the source mount 418 to help seal the manifold 409 and sample chamber 430.

The illumination source 424 is mounted in the source mount 418 and faces into an interior of the sample chamber 430. In some embodiments, the illumination mount 418 and illumination source 424 may have a generally flat front. In some embodiments, there may not be interruptions or other intrusions in the sample chamber 430 from the source carrier 400 after the surface of the illumination mount 418 and source 424.

Figure 6:
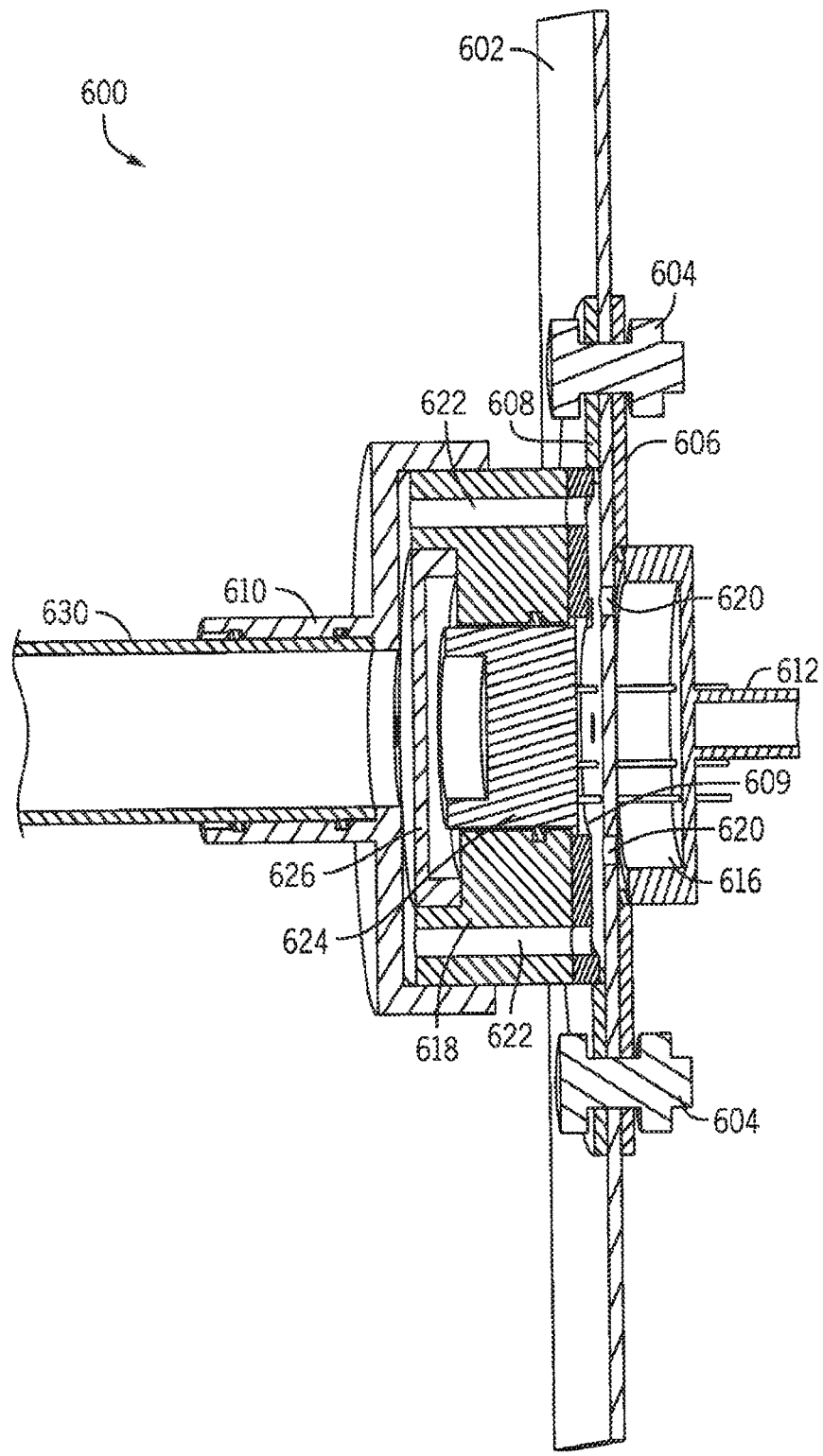
FIG. 6 is a cross-sectional schematic diagram of a detector carrier according to some embodiments of the present disclosure.
Figure 7A:
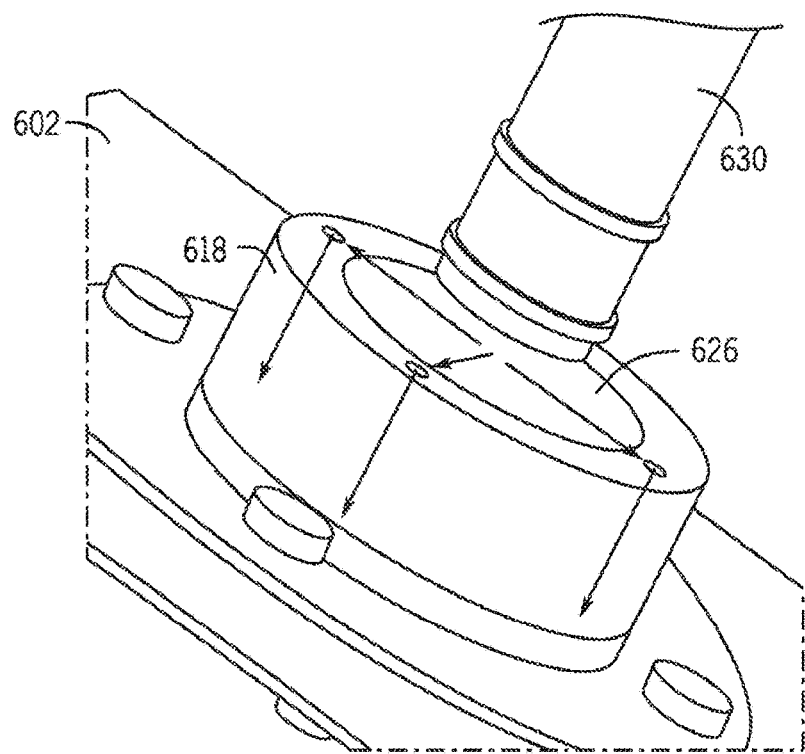
FIGS. 7A-7B are exploded perspective diagrams of the detector carrier of FIG. 6.
Figure 7B:
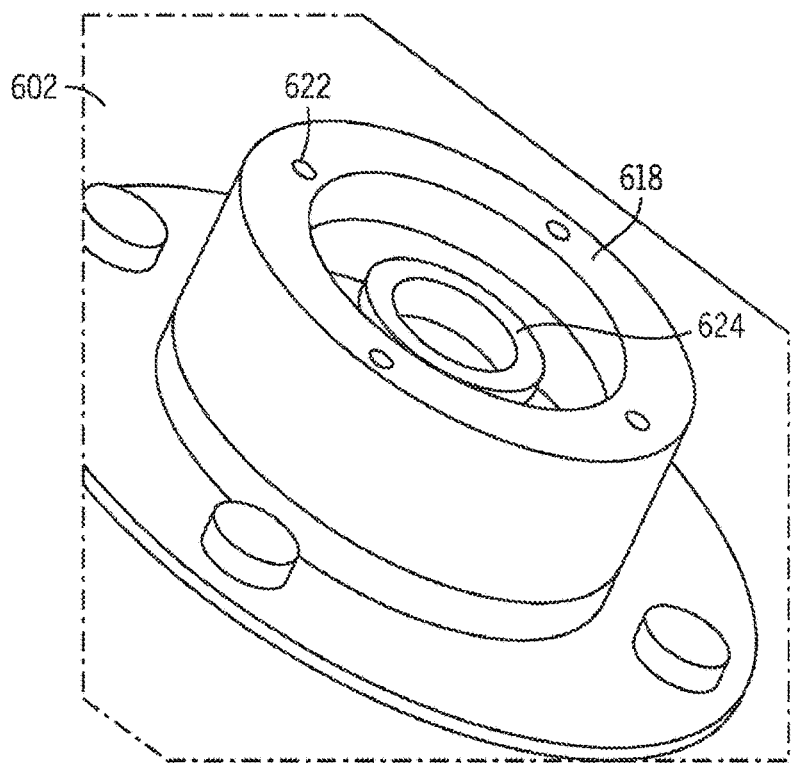

FIG. 6 is a cross-sectional schematic diagram of a detector carrier according to some embodiments of the present disclosure. FIGS. 7A-7B are exploded perspective diagrams of the detector carrier of FIG. 6. The detector carrier 600 may, in some embodiments, implement the detector carrier 130 of FIGS. 1 and/or 330 of FIG. 3. The view of FIG. 6 is a cross section along a midline plane of the sensor which intersects the line running from a first port 612 to a second port (not shown in FIG. 6). The view of FIG. 7A shows a perspective view of a front side (e.g., the side facing the sample chamber and detector carrier) of the source carrier 600. The view of FIG. 7B shows a perspective view of the front side of the carrier 600, but in the view of FIG. 7B the sample chamber 630 and filter 626 have been omitted to more clearly show the detector 624. For the sake of clarity, certain components have been omitted from the views of FIGS. 7A-7B, to better allow visualization of other components they would otherwise obstruct.

The detector carrier 600 supports a circuit board 602 (e.g., 136 of FIG. 1, 230 of FIG. 2, and/or 330 of FIG. 3) coupled to or supporting a detector 624 (e.g., 139 of FIGS. 1 and/or 222 of FIG. 2) and allows fluid communication between a port 612 (e.g., 134 of FIG. 1 and/or 334 of FIG. 3) and an interior of the sample chamber 630 (e.g., 120 of FIG. 1, 320 of FIG. 3, and/or 430 of FIG. 4). The circuit board 602 includes one or more passages 620 (e.g., 138 of FIG. 1) which allow fluid communication between a front and back side of the circuit board 602.

The circuit board 602 is mounted between two mounting plates 606 and 608 (e.g., 338 of FIG. 3). The back plate 606 and the front plate 608 are held together by one or more fasteners 604 (e.g., screws, bolts, rivets, etc.) which penetrate the two plates 606 and 608 and the circuit board 602. The back plate 606 includes a portion which is flat to the circuit board 602 and a raised portion which is raised a distance off the circuit board 602 to form a manifold 616. In some embodiments, the walls of the manifold 616 may be a separate piece which is mounted to the back plate 606. The interior of the manifold 616 is in fluid communication outside the detector carrier 600 via a port 612 (e.g., an outlet port). For example, the port 612 may be a generally tubular component which pierces a back wall of the manifold 616.

The front plate 608 includes a portion which is flat against the circuit board 602 and a portion which is raised off the circuit board 602 to form a manifold 609. The interior of the manifold 609 is in fluid communication with the interior of the manifold 616 through one or more flow apertures 620 in the circuit board 602. The flow apertures 620 may penetrate a thickness of the circuit board 602. The flow apertures 620 may be radially symmetric. For example, the flow apertures may be evenly spaced around a perimeter of a circle which is smaller than a radius of the manifolds 616 and 609.

The front plate 608 supports a detector mount 618, which in turn supports the detector 624. The detector mount 618 and detector 624 may be mounted a distance off the circuit board 602, with the manifold 609 between a front side of the circuit board 602 and a back side of the detector 624 and mount 618. The detector 624 may be coupled to the circuit board, for example along one or more wires or other connectors which extend from a back side of the detector 624. The detector mount 624 also supports a filter 626. The filter 626 may limit a range of wavelengths of light which reach the detector 624. For example, the filter 626 may be a bandpass filter limiting the light passing through to a range around an expected absorption of a target gas which is being measured. Other types of filters (e.g., longpass, shortpass, etc.) may be used in other example embodiments. The filter 626 may be a cap which fits on the mount 618 between a front surface of the detector 624 and an interior of the sample chamber 630.

The detector mount 618 has one or more passages 622 which allow fluid communication between a front side and a back side of the mount 618. A back side of the mount 618 faces the manifold 609, while a front side faces an interior of the sample chamber 630. As shown by the arrows in FIG. 7A, the flow apertures 622 and 620 allow fluid communication between the sample chamber 630, around the filter 626, past the detector 624 and detector mount 618 and through the circuit board 602 to the manifold 616 and vent 612.

The front plate 608 has a sample chamber holder 610, which couples to the sample chamber 630. Similar to the sample chamber holder 410 of FIGS. 4-5B, the sample chamber holder 610 is generally cylindrical, and an interior of the sample chamber holder 610 may mate to an exterior of the sample chamber 630. The sample chamber 630 may be held by one or more O-rings or other gaskets.

The detector 624 is mounted in the detector mount 618 and faces into an interior of the sample chamber 430 through the filter 626. In some embodiments, the filter 626 may have a generally flat front. The front of the filter 626 may face an opening of the sample chamber 630. The filter 626 and detector 624 may generally face the illumination source down a long axis of the sample chamber 630. However, other geometries may be used in other example embodiments.

Figure 8:
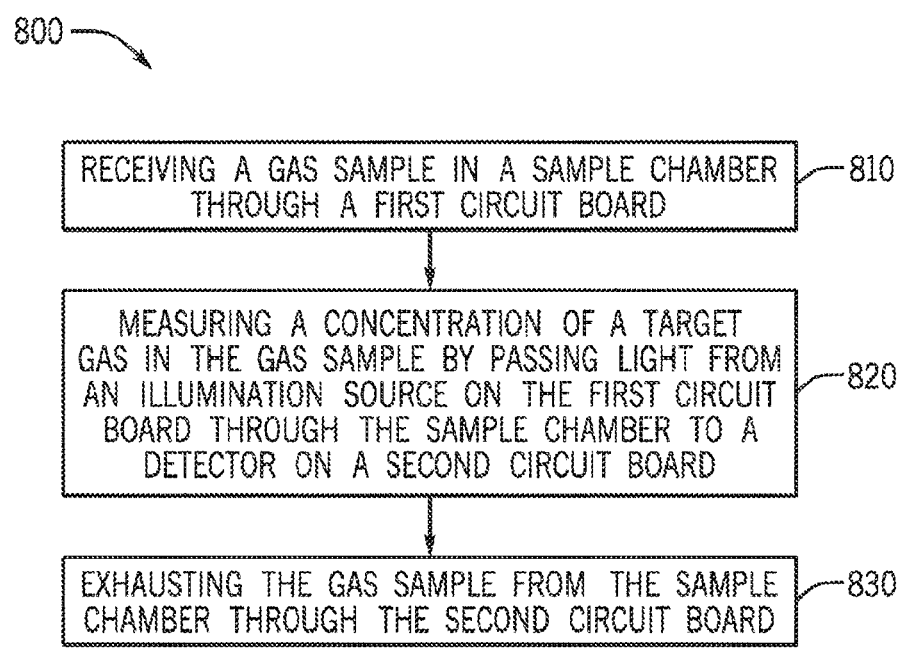
FIG. 8 is a flow chart of a method according to some embodiments of the present disclosure.

FIG. 8 is a flow chart of a method according to some embodiments of the present disclosure. The method 800 may, in some embodiments, be implemented by one or more of the systems and apparatuses described herein, such as in FIGS. 1-7B.

The method 800 may begin with box 800, which describes receiving a gas sample in a sample chamber through a first circuit board. The method 800 may include receiving the gas sample through a first port (e.g., 114 of FIG. 1, 314 of FIG. 3, and/or 412 of FIGS. 4-5B) and through one or more flow apertures (e.g., 118 of FIGS. 1 and/or 420 of FIGS. 4-5B) in the circuit board and into the sample chamber. The method 800 may include passively receiving the sample (e.g., via diffusion) or actively pumping the gas sample into the first port (e.g., with pump 104 of FIG. 1).

Box 810 may generally be followed by box 820, which describes measuring a concentration of a target gas in the gas sample by passing light from an illumination source on the first circuit board through the sample chamber to a detector on a second circuit board. For example, the method 800 may include generating light with an illumination source (e.g., 119 of FIG. 1, 212 of FIGS. 2 and/or 424 of FIGS. 4-5B) and measuring a received amount of light at the detector (e.g., 139 of FIG. 1, 222 of FIGS. 2 and/or 624 of FIG. 6-7B). The method 800 may include determining the gas concentration based, in part, on the received amount of light (e.g., using the Beer-Lambert law). In some embodiments, the method 800 may include controlling an intensity of the light based on a reference signal (e.g., Ch1 of FIG. 2) from the illumination source.

In some embodiments, the method 800 may include measuring additional properties of the gas sample with one or more sensors (e.g., 442 and 444 of FIGS. 4-5B) on the first circuit board, the second circuit board, or combinations thereof, wherein the additional properties include temperature, pressure, humidity, or combinations thereof. The method 800 may include determining the gas concentration based, in part, on the additional properties. For example, adjusting a value of an absorption coefficient used to determine the concentration based on the additional properties.

Box 820 may generally be followed by box 830, which describes exhausting the gas sample from the sample chamber through the second circuit board. In some embodiments, the method 800 may include collecting the gas sample from a suspected emission source and determining if the suspected emission source is emitting the target gas based on the measured concentration.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Terms like 'light' and 'optical' are used herein to refer to electromagnetic energy, and should not be taken as limiting the wavelengths of the electromagnetic spectrum that the present disclosure may relate to. Different applications may use different wavelengths other than those described herein, which may in turn, indicate different technologies for the illumination source and/or detector. Similarly, filters, reflectors, and other materials may generally be described with respect to an example application and its associated wavelengths and is not intended to be limiting. For example, while gold is discussed as an example reflective material herein, other reflective materials may be used in other example embodiments where other wavelengths are used.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a first port;
   a second port;
   an illumination circuit board comprising a light source configured to generate illumination light;
   a detector circuit board comprising a detector configured to measure a received portion of the illumination light; and
   a sample chamber positioned between the illumination circuit board and the detector circuit board, wherein the sample chamber is in fluid communication with the first port through the illumination circuit board and wherein the sample chamber is in fluid communication with the second port through the detector circuit board.

2. The apparatus of claim 1, wherein the illumination circuit board comprises at least one flow aperture configured to allow passage of fluid through a thickness of the illumination circuit board, and wherein the detector circuit board comprise at least one flow aperture configured to allow passage of fluid through a thickness of the detector circuit board.

3. The apparatus of claim 1, further comprising:
   a first manifold in fluid communication with the first port;
   a second manifold in fluid communication with the sample chamber, wherein the first manifold and the second manifold are in fluid communication with each other through the illumination circuit board;
   a third manifold in fluid communication with the sample chamber; and
   a fourth manifold in fluid communication with the second port, wherein the third manifold and the fourth manifold are in fluid communication with each other through the detector circuit board;
   wherein the first port is in fluid communication with a first manifold positioned on a back side of illumination electronics board and second port coupled to a second manifold positioned on a back side of detector electronics board.

4. The apparatus of claim 1, wherein the sample chamber is formed from a pipe.

5. The apparatus of claim 1, wherein the light source is a light emitting diode.

6. The apparatus of claim 1, wherein the apparatus is a non-dispersive infrared detector.

7. The apparatus of claim 1, further comprising an optical filter positioned between the sample chamber and the detector.

8. The apparatus of claim 1, further comprising at least one sensor on the illumination circuit board, wherein the at least one sensor is configured to measure temperature, pressure, humidity, or combinations thereof.

9. The apparatus of claim 1, further comprising a controller in electrical communication with the detector and configured to determine a concentration of a target gas in the sample chamber based on the received portion of the illumination light.

10. An apparatus comprising:
    a sample chamber;
    an illumination carrier comprising a first port and a first substrate having a front side and a back side opposite the front side, the front side of the first substrate configured to face the sample chamber, wherein the input carrier comprises a light source positioned on the front side of the first substrate wherein the first port is fluidly coupled through the first substrate to an interior of the sample chamber; and
    a detector carrier comprising a second port and a second substrate having a front side and a back side opposite the front side, the front side of the second substrate configured to face the sample chamber, wherein the detection carrier comprises a detector positioned on the front side of the second substrate, wherein the second port is fluidly coupled through the second substrate to the interior of the sample chamber.

11. The apparatus of claim 10, wherein the first port is configured to receive a gas sample and wherein the second port is configured to exhaust the gas sample.

12. The apparatus of claim 11, further comprising a controller configured to measure a concentration of a target gas in the gas sample based on an amount of light emitted by the light source and an amount of light received by the detector.

13. The apparatus of claim 10, wherein the first substrate comprises a first plurality of flow apertures which place the front side of the first substrate in fluid communication with the back side of the first substrate, and wherein the second substrate comprises a second plurality of flow apertures which place the front side of the second substrate in fluid communication with the back side of the second substrate.

14. The apparatus of claim 10, wherein the illumination carrier comprises:
a first back plate configured to form a first manifold between the first port and the back side of the first substrate; and
a first front plate configured to form a second manifold between the front side of the first substrate and the interior of the sample chamber, wherein the first manifold and the second manifold are in fluid communication through the first substrate, and
wherein the detector carrier comprises:
a second front plate configured to form a third manifold between the interior of the sample chamber and the front side of the second substrate; and
a second back plate configured to form a fourth manifold between the back side of the second substrate and the second port, wherein the third manifold and the fourth manifold are in fluid communication through the second substrate.

15. The apparatus of claim 14, further comprising:
a first at least one fastener configured to secure the first back plate to the first front plate through the first substrate; and
a second at least one fastener configured to secure the second back plate to the second front plate through the second substrate.

16. The apparatus of claim 10, wherein the first circuit, the second substrate, or combinations thereof include a pressure sensor, a humidity sensor, a temperature sensor, or combinations thereof.

17. The apparatus of claim 10, wherein the sample chamber is cylindrical, and wherein a first end of the sample chamber is coupled to the illumination carrier and a second end of the sample chamber is coupled to the detector carrier.

18. The apparatus of claim 17, further comprising an optical filter positioned between the second end of the sample chamber and the detector.

19. A method comprising:
receiving a gas sample in a sample chamber through a first circuit board;
detecting a concentration of a target gas in the gas sample by passing light from an illumination source on the first circuit board through the sample chamber to a detector on a second circuit board; and
exhausting the gas sample from the sample chamber through the second circuit board.

20. The method of claim 19, further comprising: controlling an intensity of the light based on a reference signal from the illumination source.

21. The method of claim 19, further comprising measuring additional properties of the gas sample with one or more sensors on the first circuit board, the second circuit board, or combinations thereof, wherein the additional properties include temperature, pressure, humidity, or combinations thereof.

22. The method of claim 21, further comprising measuring the gas concentration based, in part, on the additional properties.

23. The method of claim 19, further comprising:
collecting the gas sample from a suspected emission source; and
determining if the suspected emission source is emitting the target based on the measured concentration.

* * * * *